United States Patent Office 3,442,857
Patented May 6, 1969

3,442,857
BORON TRIFLUORIDE-HYDROGEN FLUORIDE CATALYZED SYNTHESIS OF POLY(AROMATIC SULFONE) AND POLY(AROMATIC KETONE) POLYMERS
Roger L. Thornton, Richmond, Va., assignor to E. I. du Pont de Nemours and Company, Wilmington, Del., a corporation of Delaware
No Drawing. Continuation-in-part of application Ser. No. 507,247, Nov. 10, 1965. This application Oct. 27, 1966, Ser. No. 589,793
Int. Cl. C08g 33/00
U.S. Cl. 260—47
6 Claims

ABSTRACT OF THE DISCLOSURE

The preparation of poly(aromatic ketone) and poly (aromatic sulfone) polymers in a condensation polymerization reaction employing a mixed boron trifluoride-hydrogen fluoride catalyst, the resulting polymers being useful in applications such as films and adhesives.

This application is a continuation-in-part of U.S. application Ser. No. 507,247, filed Nov. 10, 1965.
This invention relates to the preparation of polymers. More particularly, this invention is directed to the catalytic synthesis of poly(aromatic ketones) and poly(aromatic sulfones).
The need continues for improved processes for the preparation of polymers to be employed in the form of durable, shaped articles such as films, fibers, and the like. The present invention is such an improved process.
According to the present invention, useful poly(aromatic ketone) and poly(aromatic sulfone) polymers are prepared in a condensation polymerization reaction from the corresponding aromatic carboxylic acid and sulfonic acid compounds, using in the polymerization reaction a mixed boron fluoride-hydrogen fluoride catalyst.
The polymers which can be prepared according to the process of this invention include those consisting essentially of one or more of the following structural units:

(1)
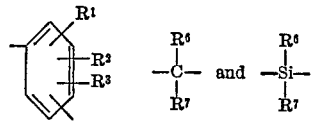

where $R^1$, $R^2$, $R^4$ and $R^5$ can be the same or different and each is selected from the group consisting of hydrogen; alkyl of 1 through 4 carbons; halogen including chlorine, bromine and fluorine; hydroxy; phenyl substituted with 1 or 2 electronegative radicals or phenoxy substituted with 1 or 2 electronegative radicals wherein the electronegative radical is nitro, nitroso, cyano, fluoro or trifluoromethyl;
$A^1$ is selected from the group consisting of

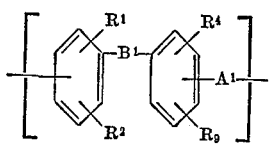 and A

A is selected from the group consisting of

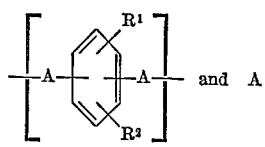 and 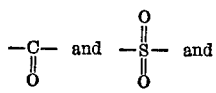 and $B^1$ is selected from the group consisting of a covalent bond, —O—, —S—,

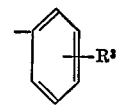

where $R^1$ and $R^2$ have the same meaning as above and $R^3$ is nitro, nitroso, cyano, fluoro or trifluoromethyl, and where $R^6$ and $R^7$ can be the same or different and each is selected from the group consisting of hydrogen, alkyl of 1 through 4 carbons, trifluoromethyl and

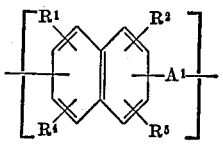

where $R^3$ has the same meaning as above;

(2)
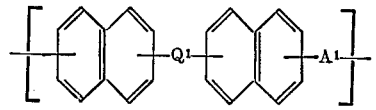

where $A^1$, $R^1$, $R^2$, $R^4$ and $R^5$ have the same meaning as above;

(3)
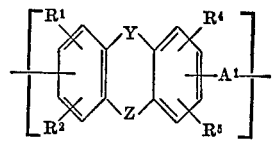

where $Q^1$ is selected from the group consisting of a covalent bond, —O— and —S—; and $A^1$ has the same meaning as above; and (4)

$$\left[ \begin{array}{c} R^1 \quad\quad R^4 \\ \diagdown Y \diagdown \\ \diagup Z \diagup \\ R^2 \quad\quad R^5 \end{array} A^1 \right]$$

where $A^1$, $R^1$, $R^2$, $R^4$ and $R^5$ have the same meaning as above; and Y and Z can be the same or different and each is selected from the group consisting of a covalent bond, —O—, —S— and —CH$_2$—.

In a broad aspect, practicing the process of the present invention, one can obtain polymers within the above scope having exceptionally high molecular weight. Polymers having inherent viscosities as high as 7.5 and higher can be prepared. At the same time, the polymers are characterized by low viscosity in the melt phase and are therefore melt extrudable.

Some polymers within the above described scope have outstanding thermal and oxidation stability, even at high temperatures over extended periods, as well as remarkable hydrolytic stability.

The above described polymers are prepared, according to the present invention, in a condensation polymerization reaction involving as the starting material one or more monomeric acids, wherein the reaction takes place in the presence of a boron fluoride-hydrogen fluoride catalyst.

Monomers useful in the process of this invention include those having the formulas:

(5)
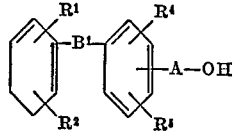

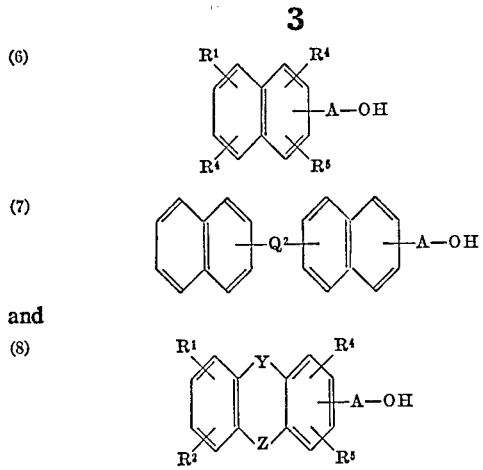

(6)

(7)

and (8)

where $Q^2$ is selected from the group consisting of a covalent bond, —O—, —S—, and A; and the other letters have the same meaning as above.

One or more of these monomers polymerize in a self-condensation reaction to give the desired polymer. It will be understood that, when a plurality of such monomers is used, there can be used two or more from each of Formulas 5 through 8 or, additionally or alternatively, monomers from two or more of the different groups of Formulas 5 through 8. It will be seen that the compounds of Formulas 5 through 8 can be identified as aromatic carboxylic acids or aromatic sulfonic acids.

By way of illustration, representative compounds within the scope of Formula 5 above include the following:

p-phenoxybenzoic acid
p-phenoxybenzene sulfonic acid
p-phenylbenzoic acid
p-tolylbenzoic acid
o-phenylbenzoic acid
m-phenylbenzoic acid
m-phenoxybenzoic acid
p-(phenylthio)benzoic acid
p-(phenylthio)benzene sulfonic acid
p-benzylbenzene sulfonic acid
p-(phenylisopropyl)benzoic acid
p-(phenylisopropyl)benzene sulfonic acid
p-(di-4-trifluoromethylphenyl)methylbenzoic acid
p-(di-trifluoromethylphenyl)methylbenzene sulfonic acid
p-(dimethyl phenyl)silylbenzoic acid
m-(phenylthio)benzene sulfonic acid
p-(phenyl 4-trifluoromethylphenyl)methylbenzoic acid
m-phenylbenzene sulfonic acid
m-phenoxybenzene sulfonic acid
o-phenoxybenzoic acid
o-(phenylthio)benzoic acid
m-(phenylthio)benzoic acid
3-(2-methylphenyl)-4-chloro-2-methylbenzoic acid Illustrative of the compounds within the scope of Formula 6 above are the following:

alpha-naphthoic acid
beta-naphthoic acid
alpha-naphthalene sulfonic acid
beta-naphthalene sulfonic acid
2,8-dimethyl-alpha-naphthoic acid
2,6-dimethyl-alpha-naphthoic acid
5-(p-nitrophenyl)-alpha-naphthoic acid Illustrative of the compounds within the scope of Formula 7 above are the following:

5-(alpha-naphthoxy)-alpha-naphthoic acid
5-(alpha-naphthylthio)-alpha-naphthoic acid
5-(alpha-naphthoyl)-alpha-naphthoic acid
5-(beta-naphthalene sulfonyl)-beta naphthalene sulfonic acid
5-(alpha-naphthyl)-alpha-naphthoic acid
6-(beta-naphthoxy)-beta-naphthoic acid Illustrative of the compounds within the scope of Formula 8 above are the following:

1-diphenylene carboxylic acid
2-diphenylene carboxylic
2-fluorene carboxylic acid
2-dibenzofuran carboxylic acid
2-thianthrene carboxylic acid
2-phenoxathiin carboxylic acid
2-phenodioxin carboxylic acid
2-dibenzothiophene carboxylic acid
1-diphenylene sulfonic acid
2-diphenylene sulfonic acid
2-fluorene sulfonic acid
2-dibenzofuran sulfonic acid
2-thianthrene sulfonic acid
2-phenoxathiin sulfonic acid
2-phenodioxin sulfonic acid
2-dibenzothiophene sulfonic acid
4,5-dimethyl-1-diphenylene carboxylic acid As will readily be understood by persons skilled in this art, the polymers of Formulas 1 through 4 can also be prepared in the process of this invention in a co-condensation polymerization reaction of one or more appropriately selected electrophilic compounds with one or more appropriately selected nucleophilic compounds. The selections will of course be made to provide a polymer having a structure as described above.

It will be understood therefore that the electrophilic compounds useful in the process of this invention will have the formulas:

(9)

(10)

(11)

(12)

and (13)

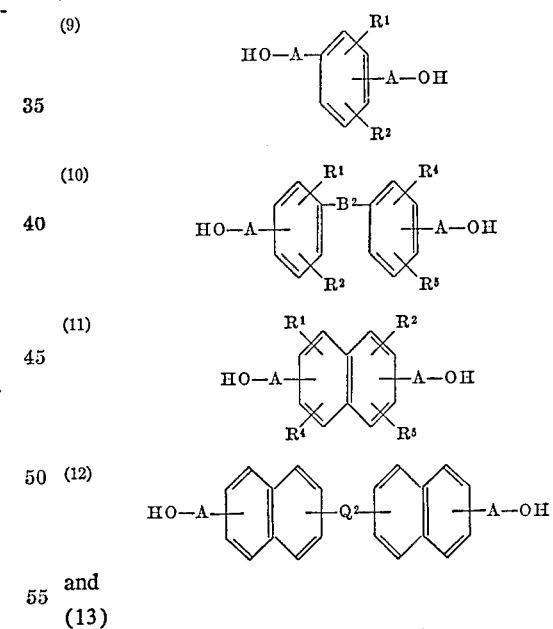

where $B^2$ can be $B^1$ or A; and each of the other letters has the same meanings as above. The compounds of Formulas 9 through 13 can be termed di(carboxylic acids) or di(sulfonic acids).

Illustrative of the compounds within the scope of Formula 9 above are the following:

terephthalic acid
isophthalic acid
benzene-1,4-di(sulfonic acid)
benzene-1,3-di(sulphonic acid)
2-chlorobenzene-1,4-disulfonic acid
2,5-difluorobenzene-1,4-di(carboxylic acid)
2,5-dimethoxybenzene-1,4-di(carboxylic acid)

Illustrative of the compounds within the scope of Formula 10 above are the following:

oxy-bis(4,4'-benzoic acid)
thio-bis(4,4'-benzoic acid)
diphenyl-4,4'-di(carboxylic acid)
oxy-bis(4,4'-benzene sulfonic acid)
benzophenone-4,4'-di(carboxylic acid)
carbonyl-bis(4,4'-benzoic acid)
oxy-bis(3,3'-benzoic acid)
thio-bis(3,3'-benzene sulfonic acid)
oxy-bis(3,3'-benzene sulfonic acid)
diphenyl-3,3'-di(carboxylic acid)
carbonyl-bis(3,3'-benzoic acid)
carbonyl-bis(3,4'-benzoic acid)
sulfonyl-bis(4,4'-benzoic acid)
sulfonyl-bis(3,3'-benzoic acid)
sulfonyl-bis(3,4'-benzoic acid)
thio-bis(3,4'-benzoic acid)
diphenyl-3,4'-di(carboxylic acid)
methylene-bis(4,4'-benzoic acid)
methylene-bis(4,4'-benzene sulfonic acid)
isopropylidene-bis(4,4'-benzoic acid)
bis(4,4'-benzoic acid) di-trifluromethylmethane
bis(4,4'-benzene sulfonic acid) dimethyl silane
oxy-bis[4,4'-(2-chlorobenzoic acid)]

Illustrative of the compounds within the scope of Formula 11 above are the following:

naphthalene-1,6-di(carboxylic acid)
naphthalene-1,5-di(carboxylic acid)
naphthalene-2,6-di(carboxylic acid)
naphthalene-1,5-di(sulfonic acid)
2,5-dichloronaphthalene-1,6-di(carboxylic acid)
3,4,7,8-tetramethylnaphthalene-2,6-di(carboxylic acid)

Illustrative of the compounds within the scope of Formula 12 above are the following:

oxy-bis[7,7'-naphthalene-2,2'-di(carboxylic acid)]
thio-bis[8,8'-naphthalene-1,1'-di(carboxylic acid)]
7,7'-binaphthyl-2,2'-(carboxylic acid)
carbonyl-bis[7,7'-naphthalene-2,2'-di(carboxylic acid)]
sulfonyl-bis[6,6'-naphthalene-2,2'-di(carboxylic acid)]

Illustrative of the compounds within the scope of Formula 13 above are the following:

dibenzofuran-2,7-di(carboxylic acid)
dibenzothiophene-1,8-di(sulfonic acid)
fluorene-2,7-di(carboxylic acid)
Thianthrene-1,8-di(sulfonic acid)

Copolymerizable with one or more of the monomers of Formulas 9 through 13 is one or more nucleophiles having the following formulas:

(14) 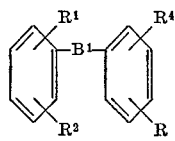

(15) 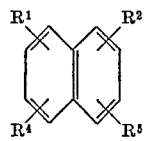

(16) 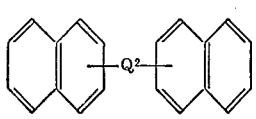

and

(17) 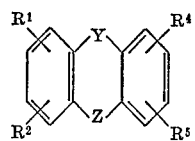

wherein each of the letters has the same meaning as above.

Illustrative of the compounds within the scope of Formula 14 above are the following:
biphenyl
diphenyl ether
diphenyl sulfide
diphenyl methane
2,2-diphenylpropane
diphenyl di-trifluoromethyl methane
diphenyl dimethyl silane
1,4-diphenyl-2-nitrobenzene
di-p-tolyl ether
di-p-tolyl sulfide
di-(2,5-dimethylphenyl) ether
p-benzylphenol
p-phenoxyphenol
p-phenylphenol Illustrative of the compounds within the scope of Formula 15 above are the following:
naphthalene
1,5-dimethylnaphthalene
2,6-dimethylnaphthalene
2,-p-nitrophenoxy)naphthalene
2,6-dimethoxynaphthalene
alpha-naphthol
betal-naphthol
1,5-dihydroxynaphthalene Illustrative of the compounds within the scope of Formula 16 above are the following:
1,1'-binaphthyl
1,2'-binaphthyl
2,2'-binaphthyl
1,1'-dinaphthyl ether
1,2'-dinaphthyl ether
2,2'-dinaphthyl ether
1,1'-dinaphthyl sulfide
1,2'-dinaphthyl sulfide
2,2'-dinaphthyl sulfide
1,1'-dinaphthyl ketone
2,2'-dinaphthyl sulfone Illustrative of the compounds within the scope of Formula 17 above are the following:
dibenzofuran
thianthrene
phenoxathiin
phenodioxin
dibenzothiophene
diphenylene Thus, it will be seen that in the process of the present invention a monomer having the structure of Formula 5 can be homopolymerized to produce a polymer having the recurring unit structure of Formula 1; a monomer of Formula 6 can be homopolymerized to produce a polymer having the recurring unit structure of Formula 2; a monomer of Formula 7 can be homopolymerized to produce a polymer having the recurring unit structure of Formula 3; a monomer of Formula 8 can be homopolymerized to produce a polymer having the recurring unit structure of Formula 4.

It will also be seen that in the process of this invention, for example, that a monomer of Formula 5 can be copolymerized with a monomer of Formula 6 to produce a polymer having randomly recurring unit structures of both Formulas 1 and 2. By way of further example, one monomer of Formula 5 can be copolymerized with a different monomer of Formula 5 to produce a polymer having randomly recurring unit structures of the corresponding units of Formula 1. In this manner there can be built up a large variety of substantially linear polymers having as mentioned above, one or a plurality of randomly recurring units of the structures of one or more each of one or more of those of Formulas 1 through 4.

As mentioned above, the present invention resides essentially in the polymerization process involving one or more monomeric starting materials as indicated above, wherein the reaction takes place in the catalytic presence of boron fluoride and hydrogen fluoride.

The amount of catalyst used in the process of this invention can vary over a fairly wide range. Preferably, of course, the amount of catalyst will be the minimum amount found sufficient to catalyze the reaction and this can readily be determined for any given reaction by a few simple tests without undue experimentation. Amounts in excess of such amount can be used but may slow down the reaction some from optimum since excess catalyst dilutes the monomers.

The amount of catalyst will ordinarily be that which provides at least a molar equivalent, preferably an excess, and most preferably at least 2 or 3 moles of boron fluoride per A group (carboly and/or sulfonyl group) in the monomeric reactants used. Preferably, less than 15 or 20 moles of boron fluoride per A group will be used. Ordinarily, no particular advantage is obtained using in excess of about 50 or 75 moles of boron fluoride per A group in the starting reactants.

The amount of hydrogen fluoride will be that which provides in excess of a molar equivalent of HF based on the amount of boron fluoride used. Preferably, from about 2 to about 10 moles of hydrogen fluoride will be used for each mole of boron fluoride. The hydrogen fluoride serves both in a catalytic capacity and as a solvent and therefore the amount of excess can be greater than 10 moles, say, 20 or 30 moles, per mole of boron fluoride without interfering with the reaction.

As will be understood readily by persons in this art, the present invention lies in the discovery that the free acid monomers described above will polymerize to great advantage under the influence of the specified mixed catalyst system. Therefore, the present invention contemplates the use of any of a variety of precursor materials such as corresponding soluble acid salts such as the sodium, potassium, calcium, etc., salts; esters such a lower alkyl eters, e.g., methyl, ethyl, etc.; anhydrides; and mixtures of these; including monomeric compounds having more than one of these groups, or other reactive groups such as acid halide group, per molecule, wherein at least one of the groups is a precursor to the carboxylic acid or sulfonic acid group.

The polymerization reactions according to the present invention will proceed within a fairly broad temperature range, ranging from as low as only a few degrees above the freezing temperatures of the reactants to as high as 100° or 150° C. For the most part, temperatures of about 100° C. or less will be satisfactory and even desirable since in some instances in the polymerization involved there will be a tendency for the product to be insoluble and resulting handling difficulties and related process problems are generally minimized when the temperature is below about 100° C.

Since it will sometimes be convenient to initiate the reaction at very cold temperatures, initial temperatures as low as −70° C. or thereabouts can be employed. Then the temperature is permitted to increase by the exothermic reaction or by external heating to a somewhat higher level. In general, temperatures between about −40° C. and about 60° C. are suitable. The particular temperature used, as well as the initial, and final temperatures, and the way the temperature increases if there is a variation during the reaction, will of course depend on the particular monomers used, catalytic ratios, whether or not the process is a batch or continuous one, the results desired, etc., as will be readily understood by persons skilled in the art in accordance with the teachings herein.

The duration of the reaction will of course be that sufficient to polymerize the reactant or reactants.

Although the process of this invention is particularly advantageous in providing the indicated polymers of very high molecular weights, low molecular weight polymers can, if desired, be produced and therefore it is appropriate to say that the duration of the reaction will ordinarily be sufficient to provide a polymer having an inherent viscosity of at least about 0.1 as measured on an 0.5% by weight solution in concentrated sulfuric acid at 30° C. Preferably, polymers having inherent viscosities of at least 0.5 will be obtained and, as mentioned above, polymers having inherent viscosities as high as 7 or 8 are readily obtainable under the conditions of this invention.

Useful polymers can be produced by the above process in reaction times as low as 15 or 20 minutes and as high as 10 or 20 hours or more. Even a minute or less is contemplated under some circumstances such as continuous operations. Very satisfactory polymers of high molecular weight are readily obtainable in a reaction period of about 4 or 5 hours. The precise duration of the reaction period will of course depend on the temperature of the reaction, the amount of catalyst present, whether or not a single temperature is maintained throughout the reaction or whether the temperature is increased as the reaction proceeds, and the like.

The process of this invention can conveniently be carried out at autogenous pressure, but pressures in excess thereof are not considered determental.

Although the process of the present invention proceeds satisfactorily under anhydrous conditions, the presence of a small amount of water will not be overly objectionable and under some circumstances may even enhance the catalytic effect of the mixture of boron fluoride and hydrogen fluoride. Ordinarily, no advantages are obtained using amounts of water in excess of about 1% by weight based on the total weight of the catalyst mixture used.

The polymer resulting from the process of this invention can be isolated, recovered and, if desired, purified according to conventional techniques. For example, the resulting mass can be dissolved in a suitable solvent, filtered to remove undissolved catalysts and impurities, and precipitated in a suitable non-solvent. Thus, by way of illustration, the copolymer of diphenyl ether with terephthalic acid is dissolved in dichlorotetrafluoroacetone hydrate, followed by filtration and precipitation in methanol, to yield a snow-white product of excellent purity.

In an exemplary procedure for carrying out the process of this invention, an autoclave is used as the reaction vessel for a batch operation. The monomer or monomers are first charged to the autoclave and reduced to quite low temperatures, say, about −75° C. Each of the two essential catalyst materials are introduced into the vessel as gases in separate metered streams, maintaining the low temperature to avoid premature reaction. The temperature is then raised to, say −20° C. and held for two hours, then to room temperature and held for four hours, with the contents of the vessel being mixed by shaking during the reaction.

The polymers resulting from the process of this invention are useful in a variety of applications. At low viscosities such as on the order of 0.1–0.3 or so they can be applied as surface coatings onto shaped articles including polymeric and non-polymeric articles. Film coatings are particularly of interest. They are likewise useful in adhesive compositions. At viscosities above about 0.3 the polymers can be used in the form of shaped articles which can be formed from the melt phase by extrusion or other convenient means. Such shaped articles include films, filaments and the like.

Films of relatively high viscosity polymers made possible by this invention are characterized by low viscosity in the melt phase. Certain of them are markedly superior in one or more properties such as thermal stability, hydrolytic stability, toughness, flex life, oxidation resistance, heat sealability, tensile strength, elongation, etc. The films can be oriented if desired in accordance with known techniques. Laminar structures utilizing one or more strata of such polymers or films, with other materials such as metal foils or other polymeric materials, are particularly useful.

This invention will be more fully understood by reference to the following illustrative examples.

EXAMPLE 1 p-Phenoxybenzoic acid (14.15 grams, 0.066 mole) was weighed into a dry rocker tube in a dry box. The tube was sealed, cooled to −80° C. and charged with 13.2 grams of hydrogen fluoride and 26.6 grams of boron fluoride. The reaction was carried out at −20° C. for 2 hours and at room temperature (24–26° C.) for 4 hours. The gases were vented and a red-purple sponge-like product was discharged into methanol in a blender. The nearly white solid which formed was collected, leached twice with refluxing methanol and dried in vacuo at room temperature overnight. A quantitative yield of the polyketone product was obtained. It had an inherent viscosity of 2.06 as measured on an 0.5% by weight solution in concentrated sulfuric acid.

EXAMPLE 2

Diphenyl ether (12.11 grams, 0.0712 mole) and isophthalic acid (11.83 grams, 0.0712 mole) were weighed into a dry rocker tube in a dry box. The tube was sealed, cooled to −80° C. and charged with 15.6 grams of hydrogen fluoride and 38.2 grams of boron fluoride. The reaction was run at −20° C. for 2 hours and at 40° C. for 2 hours. The gases were vented and the viscous red product was discharged into methanol. The light pink solid which formed was collected, leached twice with refluxing methanol and dried in vacuo overnight at room temperature. The dried solid polyketone product amounted to 20.0 grams (93.7% of theoretical). It had an inherent viscosity of 0.18 as measured on an 0.5% by weight solution in concentrated sulfuric acid.

EXAMPLE 3

Diphenyl ether (12.03 grams, 0.0707 mole) and terephthalic acid (11.74 grams, 0.0707 mole) were weighed into a dry rocker tube in a dry box. The tube was sealed, cooled to −80° C. and charged with 15.6 grams of hydrogen fluoride and 37.9 grams of boron fluoride. The reaction was carried out at −20° C. for 2 hours and at 40° C. for 4 hours. The gases were vented and the viscous purple product was discharged into methanol. The faintly pink solid which formed was collected, leached twice with refluxing methanol and dried in vacuo overnight at room temperature. The dried solid polyketone product amounted to 21.6 grams (98.2% of theoretical). It has an inherent viscosity of 0.86 as measured on an 0.5% by weight solution in concentrated sulfuric acid.

EXAMPLE 4 p-Phenoxybenzoic acid, sodium salt (0.05 mole) was weighed into a dry rocker tube in a dry box. The tube was sealed, cooled to −80° C. and charged with 12.0 grams of hydrogen fluoride and 10.2 grams of boron fluoride. The reaction was carried out at −20° C. for 2 hours and at room temperature for 3 hours. The gases were vented and a viscous blue product was discharged into methanol, the yield of the crude blue product being about 92% that of theoretical. The product was then divided into three approximately equal samples. The first sample was washed in methanol, dried and found to have an inherent viscosity of 0.4. The second sample was leached in refluxing pyridine, allowed to stand overnight in pyridine, poured into water and the solid precipitate dried and found to have an inherent viscosity of 0.42. The third sample was extracted with boiling ammonium hydroxide, poured into water and the solid precipitate dried and found to have an inherent viscosity of 0.46. Inherent viscosities were determined as in the preceding examples.

EXAMPLES 5–7

To prepare other representative polymers according to this invention, the procedures of the preceding examples can be followed to carry out the self-condensation of the following exemplary monomers:

| Example: | Monomer |
|---|---|
| 5 | Alpha-naphthoic acid. |
| 6 | Beta-naphthoic acid. |
| 7 | Beta-naphthalene sulfonic acid. |

EXAMPLES 8–28

To prepare other representative polymers according to this invention, the procedures of the preceding examples can be followed using equimolar amounts of the following exemplary co-monomers:

| Example: | Co-monomers |
|---|---|
| 8 | Diphenyl ether; napthtalene-2,6-di(carboxylic acid). |
| 9 | Diphenyl ether; naphthalene-2,6-di(sulfonic acid). |
| 10 | Diphenyl; terephthalic acid. |
| 11 | Diphenyl; isophthalic acid. |
| 12 | Diphenyl; benzene-1,4-di(sulfonic acid). |
| 13 | Diphenyl ether; benzene-1,4-di(sulfonic acid). |
| 14 | Diphenyl sulfide; terephthalic acid. |
| 15 | Diphenyl sulfide; naphthalene-2,6-di(carboxylic acid). |
| 16 | Diphenyl sulfide; isophthalic acid. |
| 17 | 2,2-diphenylpropane; oxy-bis(4,4′-benzoic acid). |
| 18 | Diphenyl dimethyl silane; terephthalic acid. |
| 19 | 2,2-diphenyl - 1,1,1,3,3,3 - hexafluoropropane; oxy-bis(4,4′-benzoic acid). |
| 20 | Diphenyl ether; diphenyl-4,4′-di(carboxylic acid). |
| 21 | Naphthalene; terephthalic acid. |
| 22 | Alpha-methylnaphthalene; isophthalic acid. |
| 23 | Beta-methylnaphthalene; oxy-bis(4,4′-benzene sulfonic acid). |
| 24 | Beta,beta′-dinaphthyl ether isophthalic acid. |
| 25 | Dibenzofuran terephthalic acid. |
| 26 | Dibenzothiophene oxy-bis(4,4′-benzene sulfonic acid). |
| 27 | Phenodioxin oxy-bis(4,4′-benzoic acid). |
| 28 | Diphenyl methane methylene-bis(4,4′-benzoic acid). |

EXAMPLES 29–42

To prepare other representative polymers according to this invention, the procedures of the preceding examples can be followed using the following exemplary co-monomers in the indicated molar proportions:

Example: Co-monomers

29 --- Diphenyl (1 mole).
Diphenyl ether (1 mole).
Terephthalic acid (1 mole).
Isophthalic acid (1 mole).

30 --- Diphenyl (1 mole).
Diphenyl ether (2 moles).
Terephthalic acid (1 mole).
Isophthalic acid (2 moles).

Example: Co-monomers
31 --- Diphenyl (2 moles).
  Diphenyl ether (1 mole).
  Terephthalic acid (2 moles).
  Isophthalic acid (1 mole).
32 --- Diphenyl (1 mole).
  Diphenyl ether (5 moles).
  Terephthalic acid (1 mole).
  Isophthalic acid (5 moles).
33 --- Diphenyl (1 mole).
  Diphenyl ether (1 mole).
  Diphenyl sulfide (1 mole).
  Isophthalic acid (3 moles).
34 --- Diphenyl (1 mole).
  Diphenyl ether (4 moles).
  Diphenyl sulfide (1 mole)
  Isophthalic acid (6 moles).
35 --- Diphenyl ether (3 moles).
  Terephthalic acid (1 mole).
  Isophthalic acid (1 mole).
  2,6-naphthoic acid (1 mole).
36 --- Diphenylene (2 moles).
  Terephthalic acid (1 mole).
  Isophthalic acid (1 mole).
37 --- p-phenoxybenzoic acid (1 mole).
  p-phenylbenzoic acid (1 mole).
  o-phenylbenzoic acid (1 mole).
38 --- p-phenoxybenzoic acid (2 moles).
  p-phenylbenzoic acid (1 mole).
  o-phenylbenzoic acid (2 moles).
39 --- p-phenoxybenzoic acid (1 mole).
  p-phenylbenzoic acid (2 moles).
  o-phenylbenzoic acid (3 moles).
40 --- p-phenoxybenzoic acid (1 mole).
  o-phenylbenzoic acid (1 mole).
  o-phenoxybenzene sulforic acid (1 mole).
  p-phenylbenzene sulfonic acid (1 mole).
41 --- p-phenoxybenzoic acid (4 moles).
  o-phenylbenzoic acid (2 moles).
  p-phenoxybenzene sulfonic acid (1 mole).
  p-phenylbenzene sulfonic acid (2 moles).
42 --- Diphenyl ether (3 moles).
  Terephthalic acid (1 mole).
  Isophthalic acid (1 mole).
  2,6-naphthalene dicarboxylic acid (1 mole).
  p-phenoxybenzoic acid (2 moles).

The foregoing detailed description has been given for clearness of understanding only and no unnecessary limitations are to be understood therefrom. The invention is not limited to the exact details shown and described, for obvious modifications will occur to those skilled in the art.

The invention claimed is:

1. The process of preparing a film and piker forming polymer consisting essentially of at least one of the recurring units selected from the group consisting of (1) 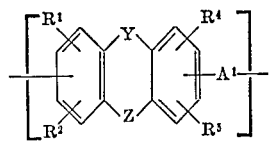

(2) 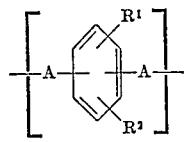

(3) 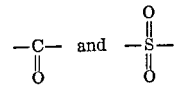

(4) 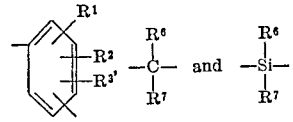

where:
$R^1$, $R^2$, $R^4$ and $R^5$ are each elected from the group consisting of hydrogen; alkyl of 1 through 4 carbons; chlorine; bromine, fluorine; hydroxy; phenyl substituted with up through 2 electro-negative radicals phenoxy substituted with up through 2 electronegative radicals wherein the electronegative radical is selected from the group consisting of nitro, nitroso, cyano, fluoro and trifluoromethyl;

$A^1$ is selected from the group consisting of

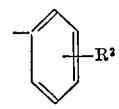

and A; A is selected from the group consisting of $$-\overset{O}{\underset{\|}{C}}- \quad \text{and} \quad -\overset{O}{\underset{\|}{\underset{O}{S}}}-$$

$B^1$ is selected from the group consisting of a covalent bond, —O—, —S—,

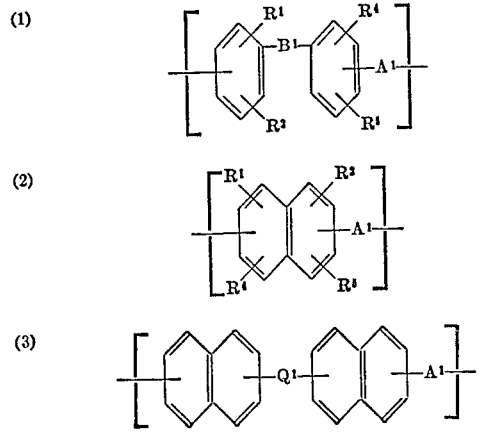

where $R^1$ and $R^2$ have the same meaning as above and $R^3$ is selected from the group consisting of nitro, nitroso, cyano, fluoro and trifluoromethyl, and where $R^6$ and $R^7$ are each selected from the group consisting of hydrogen, alkyl of 1 through 4 carbons, trifluoromethyl and where $R^3$ has the same meaning as above;
$Q^1$ is selected from the group consisting of a covalent bond, —O— and —S—; and
Y and Z are each selected from the group consisting of a covalent bond, —O—, —S— and —CH$_2$—;
said process comprising reacting at least one monomeric reactant selected from the group consisting of those having the formulas:

(5) 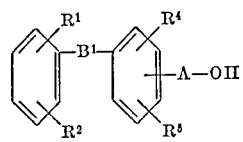

(6) 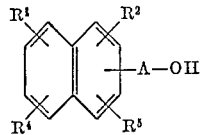

(7) 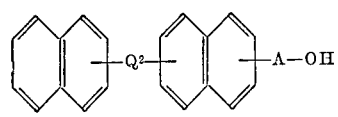

(8) 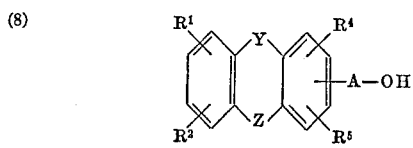

(9) 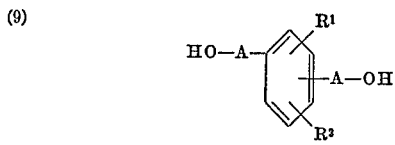

(10) 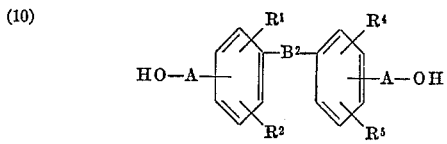

(11) 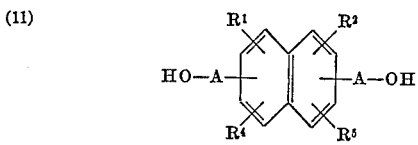

(12) 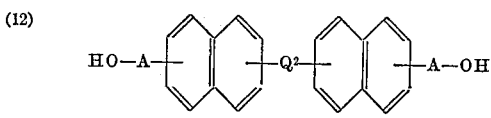

and

(13) 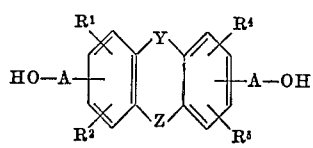

where
Q² is selected from the group consisting of a covalent bond, —O—, —S— and A;
B² is selected from the group consisting of B¹ and A; and each of the other letters has the same meaning as above; and for each said monomeric reactant of Formulas 9 through 13 an equimolar amount of a monomeric reactant selected from the group consisting of those having the formulas

(14) 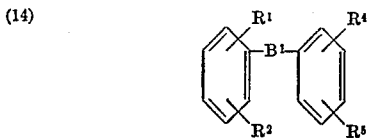

(15) 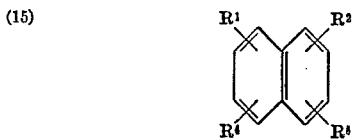

(16) 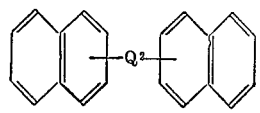

and

(17) 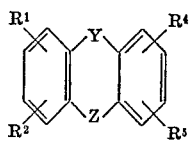

where each of the letters has the same meaning as above; said reaction being carried out in the presence of at least a molar equivalent of boron trifluoride per A radical in the monomer reactants, and in excess of a molar equivalent of hydrogen fluoride based on the amount of boron trifluoride, at a temperature and for a time sufficient to produce said polymer.

2. The process as in claim 1 carried out using from about 2 to about 20 moles of boron trifluoride per A radical in the monomeric reactants and from about 2 to about 10 moles of hydrogen fluoride per mole of boron trifluoride.

3. The process as in claim 1 carried out at a temperature in the range of from −80° to 150° C.

4. The process as in claim 1 wherein said polymer consists essentially of recurring units of Formula 1 and said monomeric reactants are selected from the group consisting of those Formulas 5, 10 and 14.

5. The process as in claim 1 wherein the monomeric reactant is p-phenoxybenzoic acid.

6. The process as in claim 1 wherein the monomeric reactants are diphenyl ether and isophthalic acid.

References Cited

UNITED STATES PATENTS 3,321,449   5/1967   Vogel _____ 260—79.3

FOREIGN PATENTS 971,227   9/1964   Great Britain.
1,383,048   11/1964   France.

OTHER REFERENCES

Olah, Friedel-Crafts and Related Reactions, N.Y., Interscience, vol I, 1963, vol. III, 1964.

Michael et al., Berichte, 10, 583–587 (1877).

Olah, Friedel-Crafts and Related Reactions, vol. III, N.Y., Interscience 1964.

U.S. Cl. X.R.

161—207, 213; 260—2, 49, 78.4, 79, 79.3

WILLIAM H. SHORT, *Primary Examiner.*

M. GOLDSTEIN, *Assistant Examiner.*

UNITED STATES PATENT OFFICE
CERTIFICATE OF CORRECTION

Patent No. 3,442,857                                                  May 6, 1969

Roger L. Thornton

It is certified that error appears in the above identified patent and that said Letters Patent are hereby corrected as shown below:

Column 1, lines 45 to 50, the formula should appear as shown below:

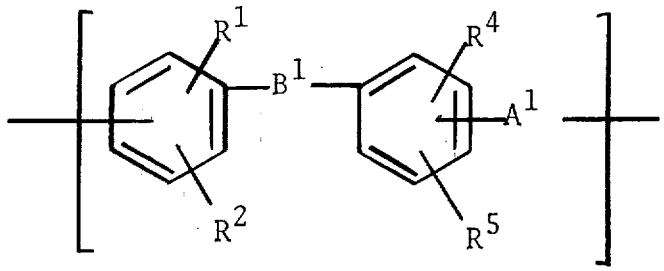

Column 5, line 49, "Thianthrene-1,8-di(sulfonic acid)" should read -- Thianthrene-1,8-di(sulfonic acid) --; lines 55 to 60, the formula should appear as shown below:

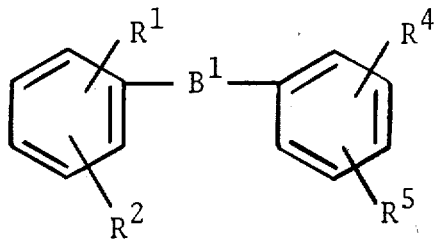

Column 6, line 31, "2,-p-nitrophenoxy)naphthalene" should read -- 2-(p-nitrophenoxy)naphthalene --. Column 7, line 23, "carboly" should read -- carbonyl --; line 44, "a" should read -- as --. Column 11, line 36, "sulforic" should read -- sulfonic --; line 55, "piker" should read -- fiber --.

Signed and sealed this 14th day of April 1970.

(SEAL)
Attest:

EDWARD M. FLETCHER, JR.                    WILLIAM E. SCHUYLER, JR.
Attesting Officer                          Commissioner of Patents